United States Patent [19]
Saeki et al.

[11] Patent Number: 5,715,519
[45] Date of Patent: Feb. 3, 1998

[54] INTERFERENCE PREVENTION COMMUNICATION CONTROL SYSTEM AND COMMUNICATION METHOD

[75] Inventors: Yuko Saeki; Noriyuki Ogawa; Keisuke Okano, all of Hiroshima, Japan

[73] Assignee: Matsushita Electric Industrial Co., Ltd., Osaka, Japan

[21] Appl. No.: 428,645

[22] Filed: Apr. 25, 1995

[30] Foreign Application Priority Data

| Apr. 28, 1994 | [JP] | Japan | 6-091748 |
| May 9, 1994 | [JP] | Japan | 6-095168 |

[51] Int. Cl.⁶ ............................................. H04B 7/26
[52] U.S. Cl. ................................. 455/54.1; 455/63
[58] Field of Search ............................ 370/85.3, 95.1, 370/85.2, 347, 337; 455/54.1, 54.2, 56.1, 63, 67.1, 67.3, 88, 68, 70, 33.1

[56] References Cited

U.S. PATENT DOCUMENTS

| 4,979,168 | 12/1990 | Courtois et al. | 370/85.3 |
| 5,276,911 | 1/1994 | Levine et al. | 455/54.1 |
| 5,490,144 | 2/1996 | Tran et al. | 370/85.3 |

*Primary Examiner*—Nguyen T. Vo
*Attorney, Agent, or Firm*—Beveridge, Degrandi, Weilacher & Young, LLP

[57] ABSTRACT

In radio communication, the invention delivers a transmission signal wave from a transmission station to a plurality of receiving stations whereby the signal wave places the station in communication with the receiving stations using the same carrier passage reciprocally. The transmission station can determine the service condition of the carrier passage on the space in which communication takes place so that generation of the carrier wave which interferes with the station in the midst of communication can be prevented. There is a signal wave transmitter for transmitting specified signal waves from the other station at intervals shorter than the transmission intervals of the response signals. There is a monitor for monitoring whether the interference wave exists in the carrier passage on the space in which the delivery of the waves is about to be performed when an optional station of the radio communication stations begins to deliver the transmission wave or transmit the signal wave. There is a controller for judging and controlling whether delivery or transmission of the transmission wave from the optional station or transmission of the signal wave should be started when the monitor judges that an interference wave exists.

6 Claims, 9 Drawing Sheets

INTERFERENCE PREVENTION COMMUNICATION CONTROL SYSTEM AND COMMUNICATION METHOD

BACKGROUND OF THE INVENTION

1. Field of the Invention

This invention relates to an interference prevention communication control system which can be utilized to prevent cross talk or contention of carrier passages caused by interference of carrier wave from adjacent stations in the radio communication system in which mobile communication stations exist.

It also relates to a communication method which achieves 1:N communication in the communication system connected by radio or bus.

2. Related Art

For control systems to prevent interference of carrier wave in conventional communication, there are pure ALOHA, slot ALOHA, BTMA, ISMA, token passing, CSMA, and the like.

Although there is a slight limitation in applying to the radio communication system which involves communication stations with directivity in transmission and reception or mobile communication stations, any one of these control systems has been applied even in radio communication.

However, defects occur in the following points when the above-mentioned control system for preventing interference of carrier wave in communication is applied to the control system for radio communication.

In pure ALOHA and slot ALOHA systems, the carrier wave communicated is unable to be guaranteed until the ACK response is returned from the receiving station. In the slot ALOHA system, a center station to transmit the slot time must be provided.

In the BTMA system, a circuit for communicating a busy tone must be provided in addition to the circuit for communicating data. It is also required to provide a center station for transmitting the busy tone.

In the ISMA system, a center station for transmitting idle signals must be provided.

In the control systems which require these center stations, center stations must be designed to constantly communicate with all the communication stations, but in radio communication, it is unable to guarantee constant communication between the center station and each communication station due to the locating condition of communication stations.

In the token passing system, it is necessary to establish the token traveling procedure. It is unable to give guarantee against a loss of token (a mobile station is lost with the token held).

In the CSMA system, the station which initiates transmission prevents occurrence of carrier wave that interferes with transmitted waves presently in communication (hereinafter called the "interference wave") by detecting a carrier wave on the space in which transmission is carried out during the carrier wave detection time. Examples of the detected subjects as carrier wave in the CSMA system include transmitted wave from the transmission station, ACK signals from the receiving station, and the like. In radio communication, there is a case in which a station unable to detect the carrier wave from all the communication stations exists, depending on the locating condition of communication stations or the directivity of transmitted wave or ACK signal of a communication station. In such event, the station which initiates transmission is unable to thoroughly grasp the service condition of the carrier passage on the space where communication takes place.

For this reason, in the conventional radio communication control system, each station cannot thoroughly grasp the service condition of the carrier passage on the space where communication takes place and may sometimes allow a carrier wave which gives interference to the stations to occur in the midst of communication. As a result, communication trouble such as cross talk occurs, generating inconvenience, which is a problem awaiting for solution.

Conventionally, in the communication system in which a base station is connected with a plurality of secondary stations by radio, infrared rays, or bus, address setting devices (switches, etc.) are provided for each one of the secondary stations and the address of the secondary stations is established with the address setting devices to prevent collision of communication between secondary stations or to identify the communication counterpart. Address is not set after communication is started but an address which does not duplicate the address of other stations is set in advance by the address setting device. For the equipment that has no address setting device as described above, communication is, in principle, limited to 1:1 communication.

However, in the communication system in which address setting is necessary for a plurality of secondary stations by means of conventional address setting devices, it is necessary to reset the address by the address setting device every time the secondary station in the communication system is added or deleted, producing a problem that the configuration of the communication system is previously fixed. It has also a problem in that the base station must transmit a notice or request for response one by one to each one of the secondary stations to prevent collision of responses from the secondary stations, resulting in poor communication efficiency when the base station needs a response from the secondary stations.

SUMMARY OF THE INVENTION

In view of the conditions as specified above of the conventional radio communication control system, it is the main object of this invention to provide an interference prevention communication control system in which a station that initiates transmission or reception in radio communication is able to determine whether it should begin or wait for transmission or reception thereafter and can prevent generation of interference wave which has a possibility to interfere with the stations presently in communication irrespective of the location condition or installation environment of the communication station.

In the communication control system which utilizes response signals returned from other stations to receive the transmission wave and used for judging whether the transmission wave is correctly transmitted by the specified station when the specified station provided the transmission wave to other stations in a plurality of radio communication stations, this invention is able to prevent occurrence of an interference wave in advance by carrying out control so as to prevent delivery of the transmission wave or transmission of the signal wave from the optional station; for example, when the monitoring means judges that the interference wave exists, this invention provides a means for transmitting signal waves for delivering a specified signal wave from the other station at intervals shorter than the transmission intervals of the response signal and a means for monitoring whether the interference wave exists in the carrier passage on the space in which the signal wave is to be sent when an optional station of the radio communication stations begins delivering the transmission wave or transmitting the signal wave, and a control means for judging whether the delivery of the transmission wave or transmission of the signal wave from the optional station should be allowed to take place.

This invention is an interference prevention communication control system wherein the said response signal is a ACK signal or a NCK signal.

This invention is an interference prevention communication control system which is provided with a signal wave transmission means for transmitting a specified signal wave from another station at intervals shorter than the transmission intervals of the packet in the packet transmission when a specified station in a plurality of radio communication stations which carry out packet communication transmits transmission wave to other stations, a monitoring means for monitoring whether there exists an interference wave in the carrier passage on the space in which a transmission wave is sent out when an optional station of the radio communication stations intends to initiate delivery of the transmission wave or transmitting the signal wave, and a control means for judging whether the delivery of the transmission wave or transmission of the signal wave from the optional station should be initiated or not, when the monitoring means judges that there exists a interference wave.

This invention is an interference prevention communication control system which judges that the interference wave does not exist when the said monitoring means does not detect the interference wave during the monitoring time at least equivalent to the intervals of the signal wave in the monitoring.

This invention intends to provide a communication method which can flexibly accommodate changes of communication system configuration and improves the communication efficiency in view of the problems specified above in the conventional communication system.

This invention inputs the total number N of the secondary stations X of communication counterparts into the base station H in advance and simultaneously broadcasts the total number N of the secondary stations X when the communication start is broadcasted from the base station H, in the communication method which carries out 1:N communication between the base station H and the total N of secondary stations X. The secondary station X which received the notice generates random number $R_n$ of the type (N+α) (α is an integer equal to or greater than 0), respectively, and based on the random number $R_n$, the time value $t_n$ is calculated and $t_n$ time after receiving the broadcast from the base station H, the data is transmitted to the base station H, respectively. In this way, a response to the broadcast from the base station H is sent, and collision of communication from the secondary station X to the base station H is prevented.

This invention inputs the total number N of the secondary stations X, communication counterparts, into the base station H in advance in the communication method in which 1:N communication is carried out between the base station H and the secondary stations X, and at the same time broadcasts the total number N when the communication start is broadcasted from the base station H. The secondary stations X which received the notice generates the random number $R_n$ of the type (N+α) (α is $a_n$ integer equal to or greater than 0) and optional other random number $a_n$, respectively, and based on the random number $R_n$, the time value $t_n$ is calculated, and $t_n$ time after receiving the broadcasted information from the base station H, the secondary stations X transmit the random numbers $R_n$ and $a_n$ to the base station H, respectively. The base station H which received the random numbers broadcasts the random number $R_n$, random number $a_n$ itself, or information obtained based on the predetermined rule to the secondary stations X after allowing more than a specified time to pass. The secondary stations X which received the broadcasted information set the $R_n$ for $R_n$ in the random number $R_n$ and random number $a_n$ replied to the address of the secondary stations and at least for part of or total of $R_n$ in the random number $R_n$ and random number $a_n$ not replied, $R_n$ and $a_n$ are generated again and sent to the base station H. In this way, repeatedly generating and replying random numbers $R_n$ and $a_n$ to the broadcasted information on the random number information and their notices between the base station H and the secondary stations X until the address is set for all of the secondary stations X, the address of the secondary station X is set.

DESCRIPTION OF THE PREFERRED EMBODIMENTS

Now, one embodiment according to the present invention will be described with reference to the accompanying drawings.

Figure 1:
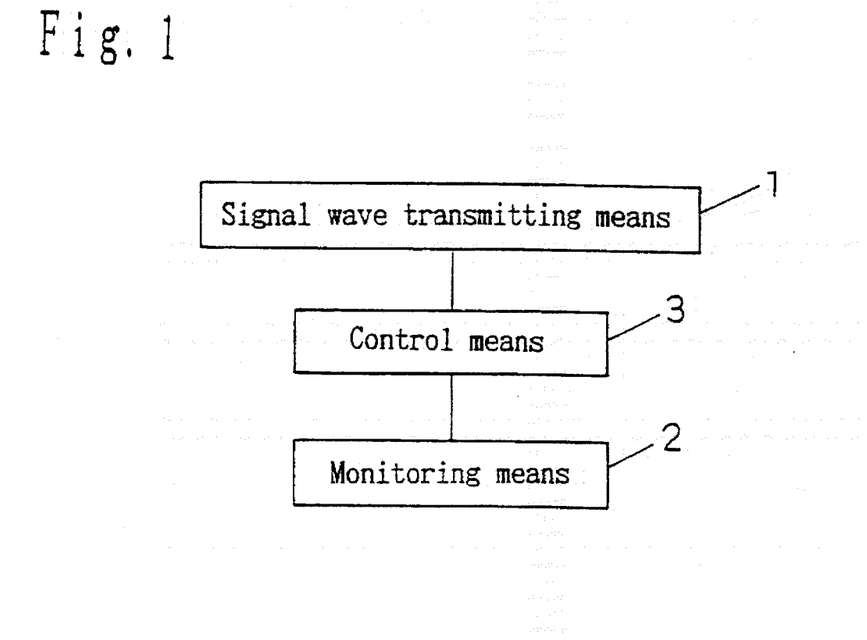
FIG. 1 is a block diagram showing a communication station used for the first embodiment of the interference prevention communication control system according to this invention.
Figure 2:
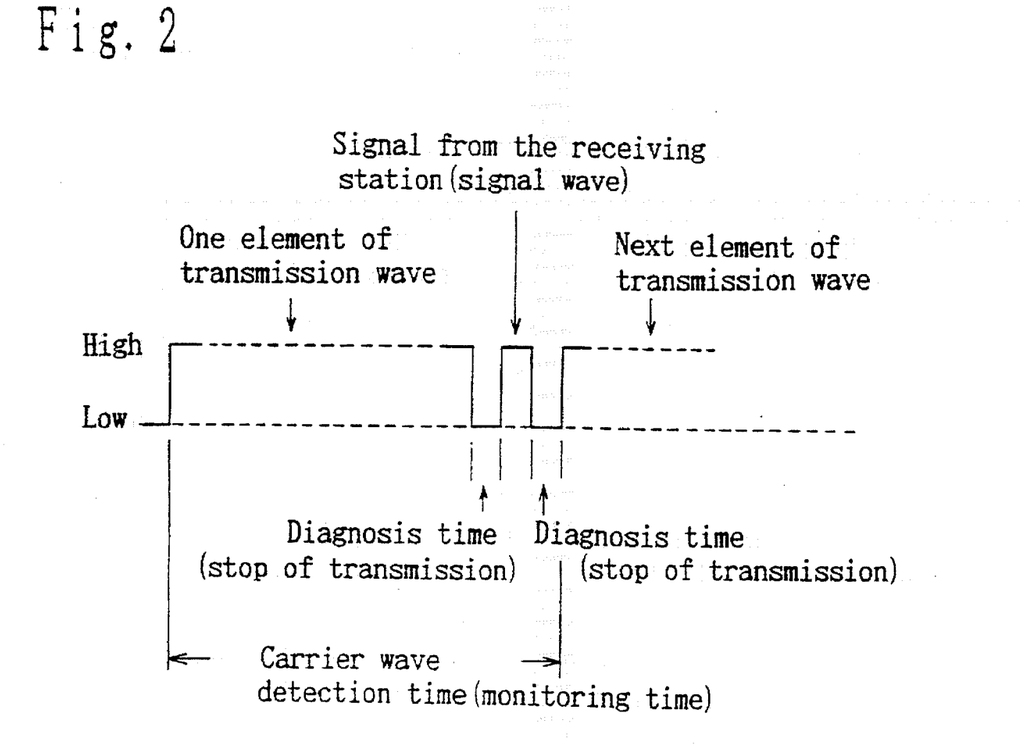
FIG. 2 is a schematic diagram showing the carrier wave used for the first embodiment of the interference prevention communication control system according to this invention.

FIG. 1 is a block diagram showing a communication station used for the first embodiment of the interference prevention communication control system according to this invention and FIG. 2 is a schematic diagram showing the carrier wave used for the first embodiment of the interference prevention communication control system according to this invention, and now referring to these figures, the configuration and the operation of this embodiment are described.

As shown in FIG. 1, the signal wave transmitting means 1 is a means for transmitting one signal wave (see FIG. 2) from the communication station which serves as a receiving station at intervals shorter than the transmission intervals of the response signal such as ACK, etc. The monitoring means 2 is a means for monitoring whether there exists an interference wave at the carrier passage in the space in which the signal wave is to be sent out when the communication station is ready to begin delivery of the transmission wave or transmitting the signal wave. The control means 3 is a means for controlling to prevent the start of transmission of the transmission wave or signal wave from the communication station when the monitoring means 2 judges that the interference wave exists. Each communication station is configured as shown in FIG. 1.

In this embodiment, to prevent interference of the carrier wave, monitoring of the carrier wave (interference wave) on the space in which communication takes place is achieved by the monitoring means 2 for detecting two types of carrier waves: that is, the transmission wave sent from the transmitting station and the signal wave transmitted from the receiving station by the signal wave transmitting means 1.

For example, the time in which the station that is going to transmit monitors the carrier wave on the space in which communication takes place using the monitoring means 2 is designated as the carrier wave detection time. As shown in FIG. 2, this is a differential time from the delivery initiation time of one element of the transmission wave to the delivery initiation time of one element of the next transmission wave (including the transmission time of the signal wave from the receiving station). That is, the carrier wave detection time is, in other words, the intervals of signal wave from the receiving station. However, the length of one element of the carrier wave is predetermined in this system, where the carrier wave detection time corresponds to the monitoring time of this invention.

Figure 3:
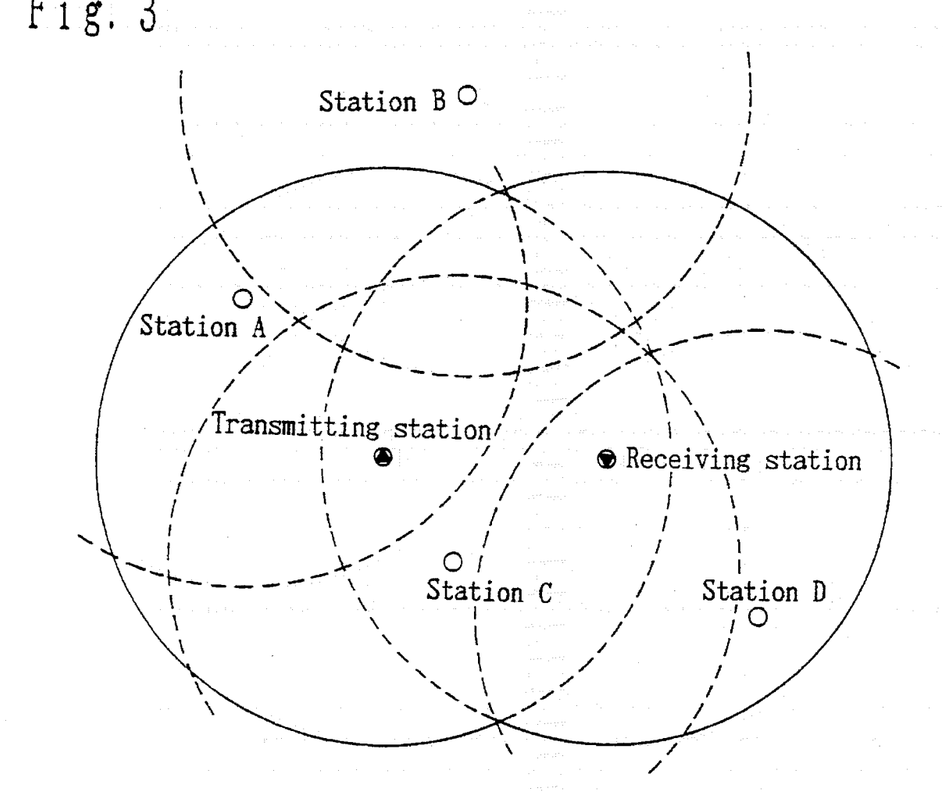
FIG. 3 is an illustration showing a plurality of stations in the first embodiment of the interference prevention communication control system according to this invention.

FIG. 3 is a schematic diagram showing a plurality of stations in the interference prevention communication control system of the present embodiment. This figure shows the space(that is, the space in which a communication station that may generate carrier wave with a possibility of interfering with stations in communication) to which the carrier wave from the transmission and receiving stations in communication can reach, while FIGS. 4–7 show the contents of the carrier wave, which stations located at various places detect in FIG. 3. In FIG. 3, the space enclosed with thick lines means a space to which the carrier wave from the transmitting and receiving stations in communication reaches when this invention is applied. The space enclosed with dotted lines means the space in which communication of each communication station reaches.

Now, in FIG. 3, assume that the transmissing station is communicating with the receiving station.

Figure 5:
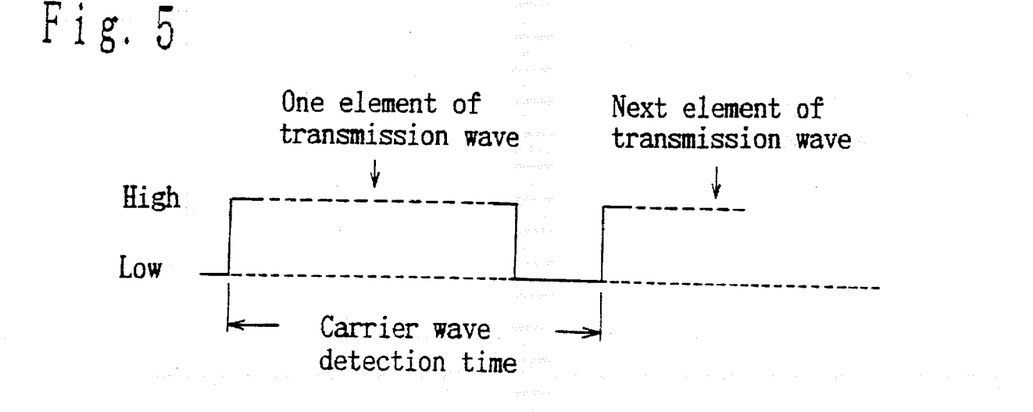
FIG. 5 is a schematic diagram showing a carrier wave which the station A of the first embodiment detects.
Figure 6:
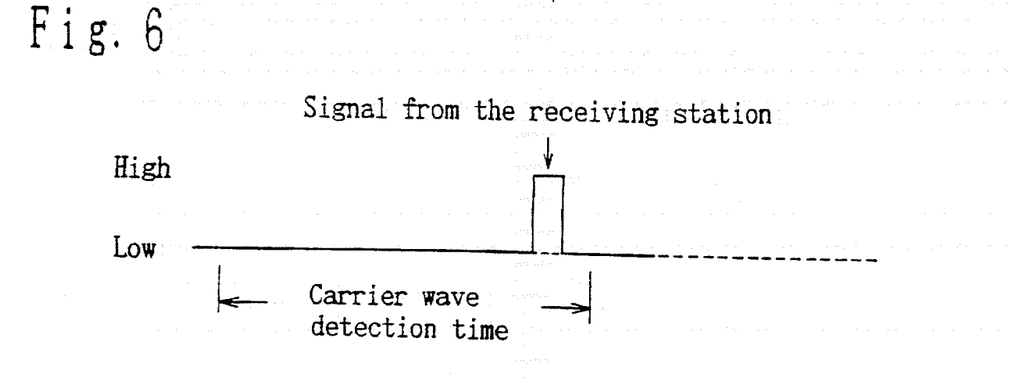
FIG. 6 is a schematic diagram showing a carrier wave which the station D of the first embodiment detects.
Figure 7:
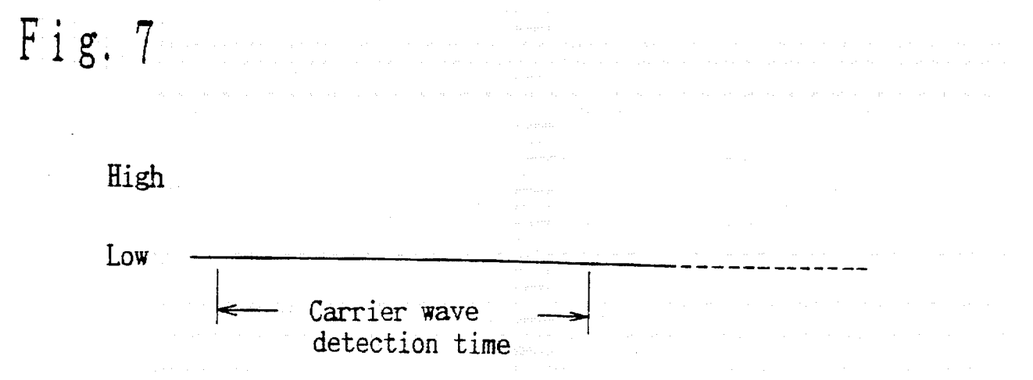
FIG. 7 is a schematic diagram showing a carrier wave which the station B of the first embodiment detects.

In this event, when the station A begins transmission, the station A detects the transmission wave from the transmitting station within the carrier wave detection time using the monitoring means 2 (FIG. 5). As a result, transmission can be delayed in accordance with the control of the control means 3.

Description will be made on the case when the station A does not wait for transmission and begins transmission despite the above-mentioned condition.

The carrier wave from the station A interferes with the transmitting station presently in communication and affects monitoring of the signal wave from the receiving station which is carried out by the transmitting station presently in communication. Consequently, communication presently underway fails. To prevent the failure of communication as described above, the station A shown in FIG. 3 waits for transmission as described above.

Because the carrier wave presently in communication is not detected (FIG. 7) within the carrier wave detection time when the station B shown in FIG. 3 intends to begin transmission, transmission begins. In this event, the carrier wave from the station B does not interfere with the station presently in communication (because it is located outside the reach of the carrier wave from the station B).

Figure 4:
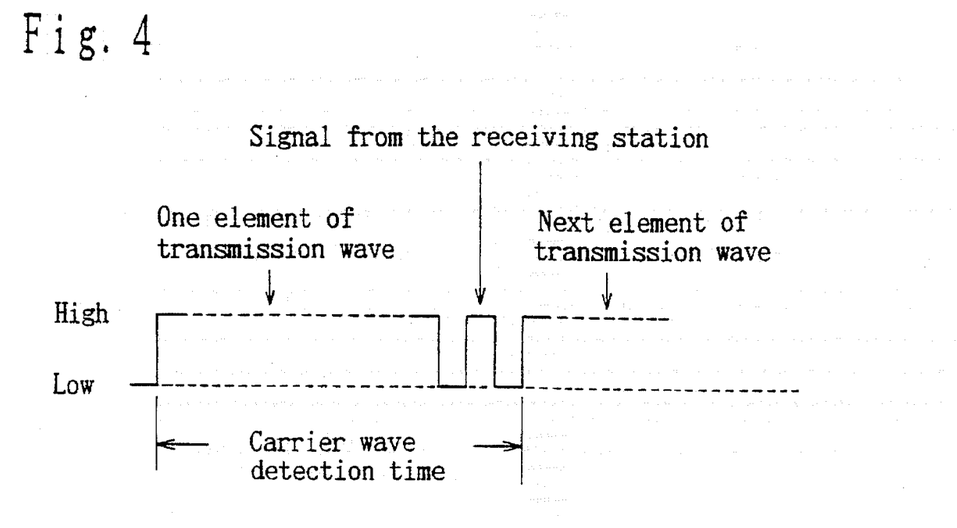
FIG. 4 is a schematic diagram showing a carrier wave which the station C of the first embodiment detects.

However, if the communication counterpart of the station B is located within the communication range in which the transmitting or receiving station presently communicating, the communication counterpart detects the interference wave within the carrier wave detection time by carrying out the above-mentioned monitoring using the above-mentioned monitoring means 2, when the communication counterpart begins transmission of the signal wave (FIG. 4). As a result, because signal waves are not transmitted from the communication counterpart of the station B in accordance with the control of the control means 3, the station B utilizes the said monitoring means 2 during transmission and judges that the signal wave from the counterpart station to be replied cannot be detected, and based on the judgment result, the station B is able to stop transmission. In this way, transmission presently underway can be guaranteed.

Next, when the station C intends to begin transmission, the station C detects the transmission wave from the transmitting station and the signal waves from the receiving station within the carrier wave detection time by the monitoring means 2 (FIG. 4), thereby enabling itself to wait for transmission in accordance with the control of the control means 3.

Now, description is made on the case when the station C does not wait for transmission and begins transmission.

The transmission wave from the station C interferes with the receiving station presently in communication and therefore the communication presently underway fails. To prevent this kind of transmission failure, the station C shown in FIG. 3 waits for the transmission as described above.

Then, when the station D intends to begin transmission, the station D detects the signal wave from the receiving station within the carrier wave detection time by the monitoring means 2 (FIG. 6), thereby enabling itself to wait for the transmission in accordance with the control of the control means 3 in the same manner as described above.

Description is made on the case when the station D does not wait for transmission and begins transmission despite the above-mentioned condition.

The transmission wave from the station D interferes with the receiving station presently in communication and therefore the communication presently underway fails. To prevent this kind of transmission failure, the station D shown in FIG. 3 waits for the transmission as described above.

Figure 8:
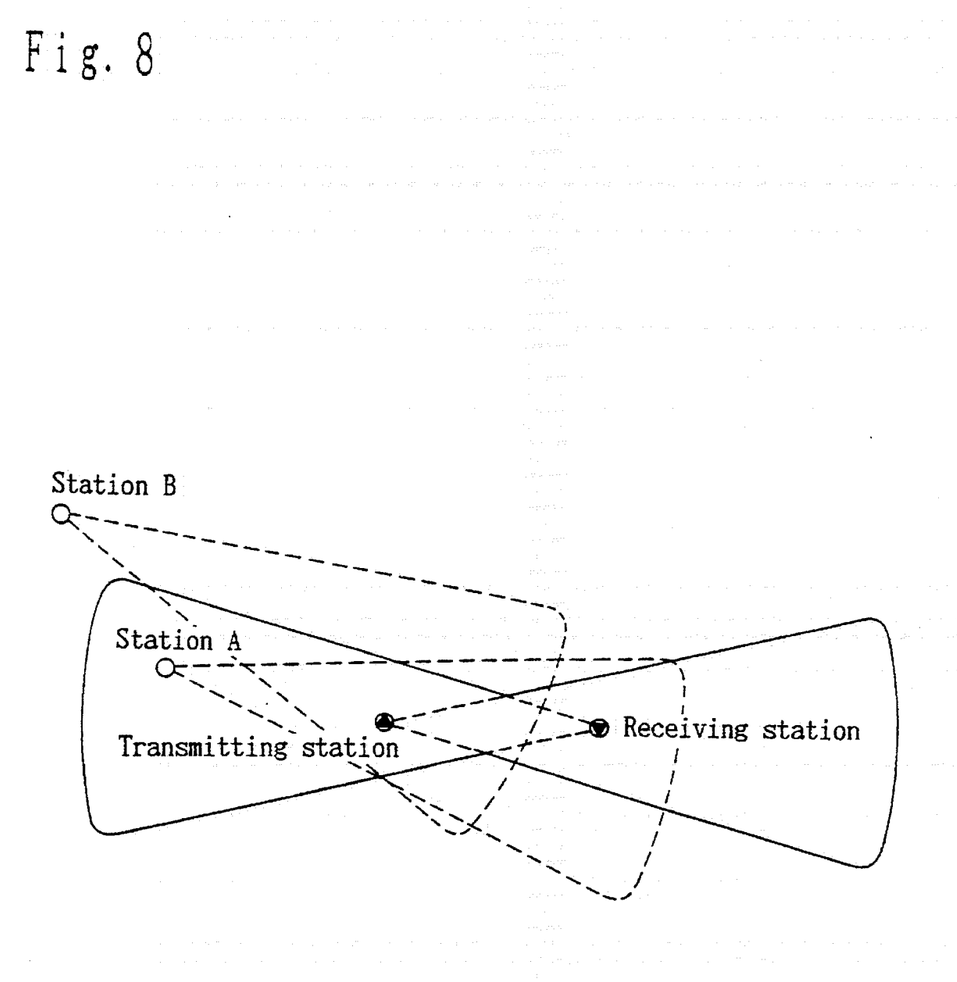
FIG. 8 is a schematic diagram showing another communication condition of the first embodiment (with directivity and without shields)
Figure 9:
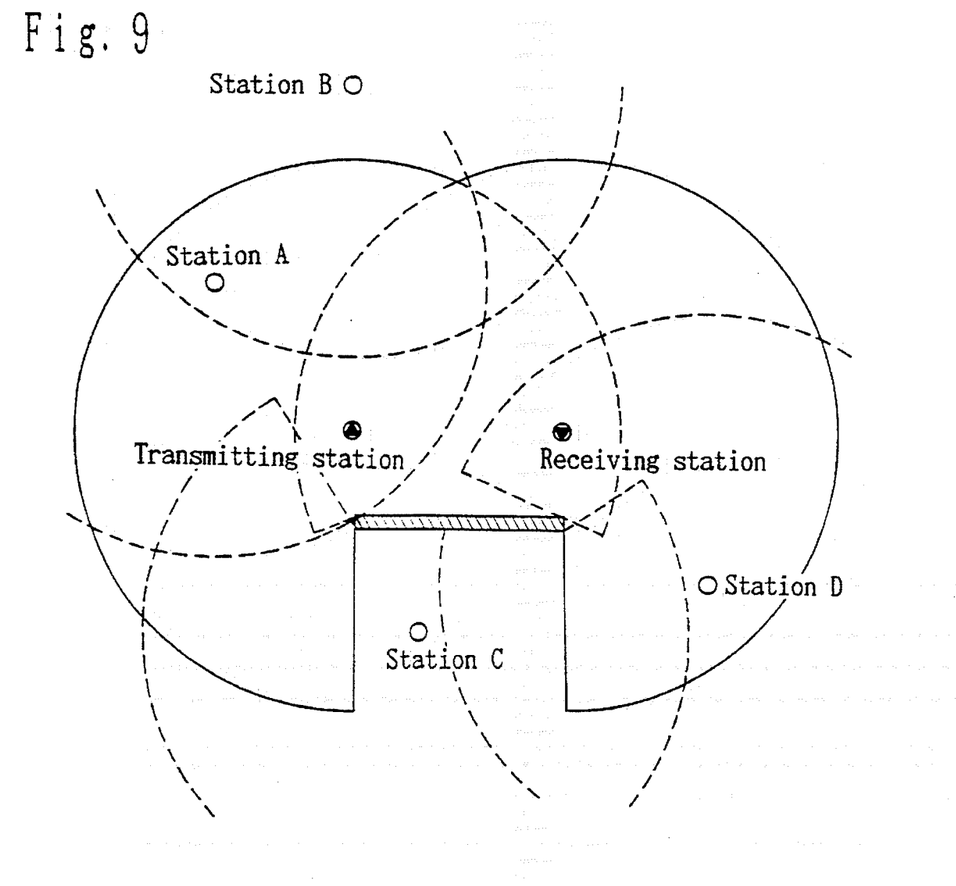
FIG. 9 is a schematic diagram showing another communication condition of the first embodiment (with no directivity and with shields)

Now, FIG. 8 is a figure similar to FIG. 3, but it shows the case when the transmission direction of the transmitting station has directivity. FIG. 9 is a figure similar to FIG. 3, but it shows the case when a substance shielding the transmission exists in the space where communication takes place.

Figure 10:
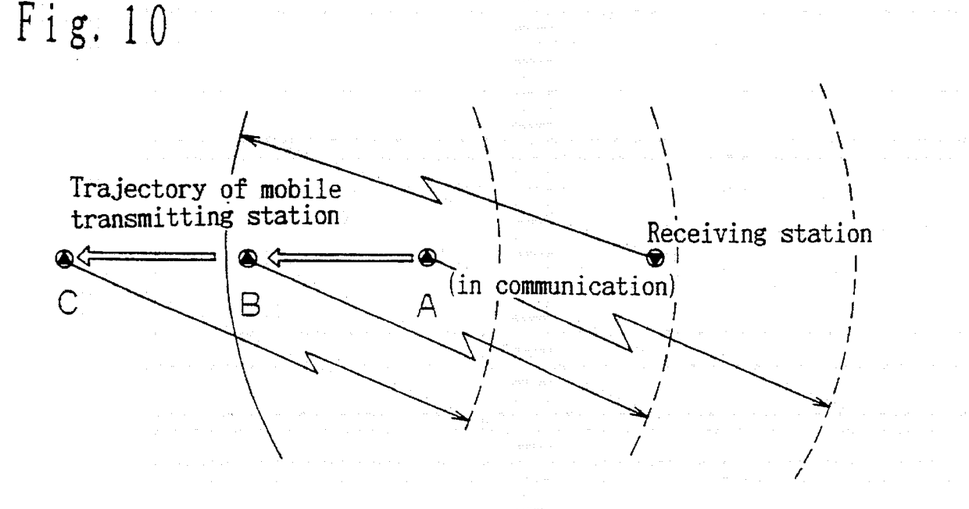
FIG. 10 is a schematic diagram showing another example in the communication condition at the mobile station of the first embodiment (with directivity and without shields)

In addition, FIG. 10 shows the coverage of the carrier wave when the communication station is a mobile station. In the case of FIG. 10, the transmitting station is travelling. The contents of the carrier wave which the transmitting station in communication detects are as shown in FIG. 4 when the transmitting station that can detect the transmission wave which the station itself transmits is located at positions A and B shown in FIG. 10. When the transmitting station goes over the coverage of the signal wave from the receiving station (position C), the contents of the carrier wave becomes those shown in FIG. 5. Therefore, this transmitting station utilizes the said monitoring means 2 during transmission to monitor the signal wave returned from the receiving station by the above-mentioned monitoring means 2. In this event, the transmitting station can detect that the signal wave which should have been returned is unable to be detected and can diagnose the condition of the receiving station such as loss of receiving stations, and the like. In this way, because in radio communication, there is a possibility that transmitting stations may travel, the transmitting station in the midst of transmission is allowed to grasp the loss of the receiving station much faster than before and take proper action.

In this way, in this embodiment, providing a. a means for transmitting the signal wave, which means that the receiving station under reception is now receiving, and at the same time, broadcasting the existence of the station under reception to the adjacent stations on the carrier passage same as that of the transmission wave in response to the elements of the transmission wave;

b. a means for enabling the station that initiates transmission to detect not only the transmission wave from the transmitting station but also the signal wave from the receiving station, which means that the receiving station is now under reception within the carrier wave detection time, and to determine whether adjacent stations presently in communication exist by monitoring these two types of carrier waves;

c. a means for enabling the station that initiates transmission to judge whether it should start or wait for the transmission thereafter based on the results of Item b irrespective of the locating condition or installation condition of communication stations and to prevent generation of carrier wave that may interfere with the station presently in communication;

d. a means for enabling the transmitting station to detect the signal wave from the receiving station, which means that the station is now receiving the information and to diagnose the condition of the receiving station even in the midst of transmission by monitoring the signal wave from this receiving station; and e. a means for enabling an optional station to recognize the existence of transmission wave from the transmitting station presently communicating or the signal wave from the receiving station, allows the control that enables broadcasting the service condition of the carrier passage on the space where the communication takes place to all the communication stations existing in the space (space actually required for radio transmission) which may have a possibility to cause interference of carrier wave to the transmitting and receiving stations by transmitting the signal wave also from the receiving station during communication. As a result, it is possible to reduce the number of re-tries of transmission caused by the interference of the carrier wave as compared to the conventional control system, thereby improving communication efficiency.

It also enables the control for the transmitting station to detect the condition of the receiving station during transmission by monitoring the signal wave from the receiving station. As a result, the transmitting station can predict the communication results before an ACK response is issued, improving the transmission efficiency because actions such as interruption of transmission can be taken more quickly.

It is also possible to reduce generation of carrier wave that may interfere with the communication presently in session by restricting the delivery of the carrier wave from an optional station located in the space in which communication is underway.

The transmitting station can interrupt the transmission thereafter when the signal wave from the receiving station located in the space in which communication is underway is unable to be detected.

Based on this, even the station to which the transmission wave from the transmitting station under transmission is unable to be reached in radio transmission due to the locating condition or installation condition of the communicating station is able to grasp the service condition of the carrier passage on the space in which communication takes place by detecting the signal wave from the receiving station under communication. This enables the restriction of the delivery of carrier wave from the station which can interfere with the transmission wave under communication and can prevent cross talk or contention. Because the transmitting station under transmission can detect the condition of the receiving station by monitoring the signal wave from the receiving station, it becomes possible to take prompt action against communication troubles (busy or lost receiving stations).

In the above embodiment, description was made on the case in which the signal wave transmitted from the receiving station is one of the signals transmitted in response to one element of the transmission wave delivered from the transmission station, but this invention shall not be limited to this but two signals may be transmitted in response to one element of the transmission wave and the number of signals is not a limiting factor. Consequently, the monitoring time for the above embodiment, in this case, should be determined, with this plurality of signals considered as one complete signal wave.

The radio communication station of the above embodiment may be naturally the case in which a specified station in a plurality of radio communication stations that carry out packet communication transmits the transmission wave to another station, for another example, and in such event, as long as the specified signal wave transmitted from the said other station is transmitted at the intervals shorter than that of the packet in the packet transmission, the presence or absence of response signals in the packet communication does not matter. In this event, the response signal means the signal which is returned from the other station that should receive the transmission wave when the transmission wave is transmitted to the station by a specified station in a plurality of radio communication stations and is used to determine whether the said specified station has transmitted correctly the transmission wave.

As clear from what has been described above, this invention has an advantage in that generation of interference wave that may interfere with the station presently under communication can be prevented more precisely than by conventional systems.

Figure 11:
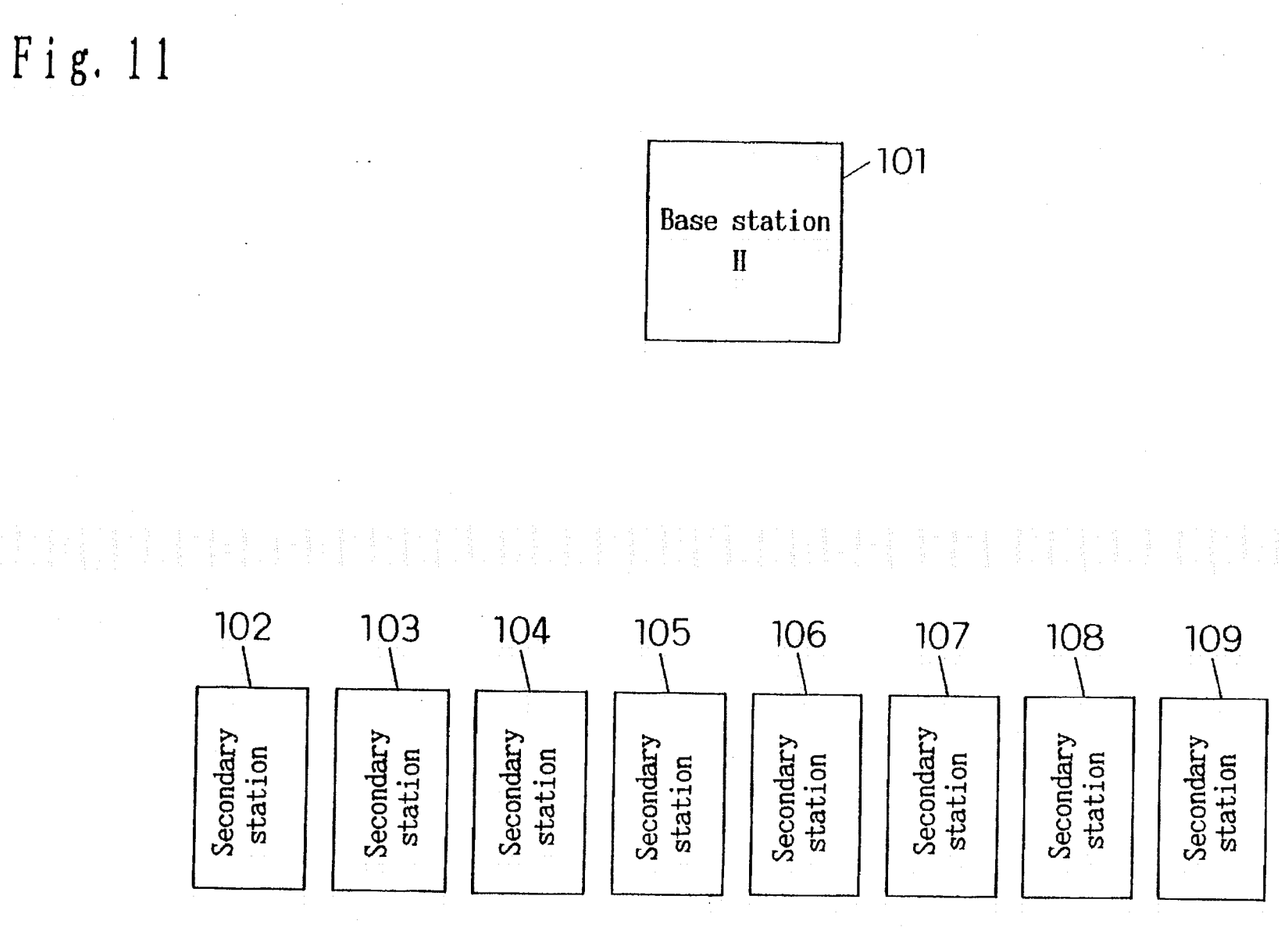
FIG. 11 is a configuration diagram showing the overall communication system in the communication method of the second embodiment.

FIG. 11 is a configuration diagram showing the overall communication system in the communication method of the second embodiment. That is, the communication system consists of a base station H 101 and eight secondary stations 102–109 which can achieve communication by infrared rays. This may be the case, in which, for example, in meetings, the chairman serves as a base station and each attendant has a portable terminal, and proceedings are progressed between the two parties through communication.

Now, description will be made referring to the case of the treatment at the start of communication when the number of secondary stations (N) is 8 and the additional value $\alpha$ is 2, which minimizes the possibility of duplicating the random number $R_n$ for calculating the time value at a plurality of secondary stations (consequently, (N+$\alpha$)=10).

Figure 12:
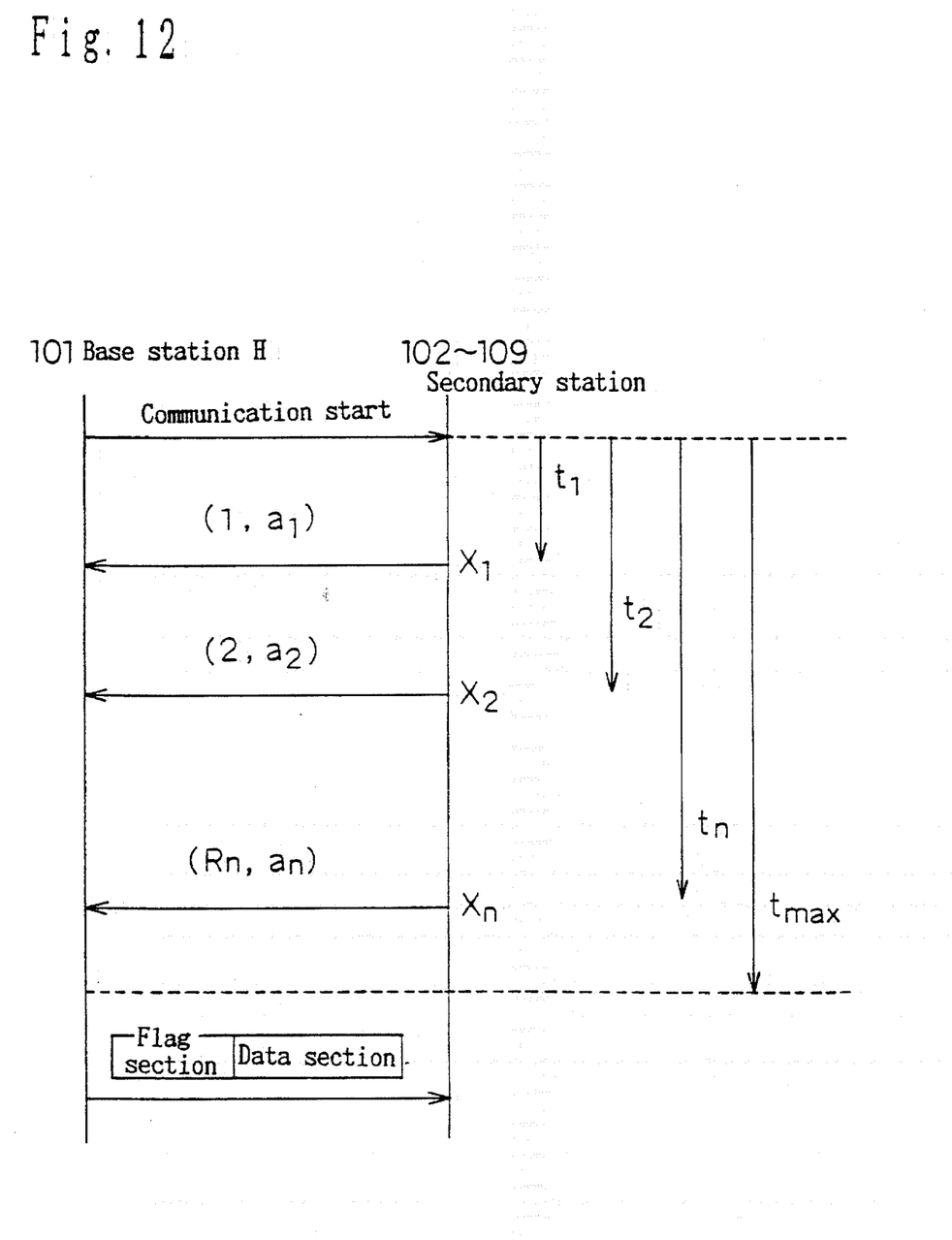
FIG. 12 is a diagram showing an example of the communication procedure between the base station H and each one of the secondary stations $X_1$-$X_n$ from broadcasting of the communication start to broadcasting of the initial flag section and data section in the second embodiment.

FIG. 12 is a diagram showing transaction in communication from broadcasting at the start of communication to broadcasting the initial flag section and the data section. In this event, prior to starting communication, the total of eight secondary stations to be communicated is inputted into the base station H in advance.

First of all, the start of communication is broadcasted from the base station H. In this event, the total of eight secondary stations, which are inputted in advance, is broadcasted. Next, the secondary station $X_n$ that received the broadcasting generates the random number $R_n$ from integers 1 to 10 (8+2) and another optional random number $a_n$ inside, and calculates the time value $t_n$ by giving the random number $R_n$ to the calculation formula common to secondary stations. Thereafter, $t_n$ time after it received the broadcasting of the communication start from the base station H, the secondary station transmits the said random number $R_n$ used for determining the time value and the optional random number $a_n$ to the base station H. Then, because each one of the secondary stations replies in accord with the time value $t_n$ based on the random number $R_n$ generated, respectively, collision of the replies to the base station H from a plurality of secondary stations $X_1$ to $X_n$ can be prevented as long as the generated random number $R_n$ differs.

Then, the base station H that received the replies from the secondary stations establishes the random numbers $R_n$, $a_n$ which have been received by then after $t_{max}$ time calculated from the maximum value of $R_n$, 10 in the form shown in FIG. 13 (later described), and broadcasts them to the secondary stations.

Figure 13:
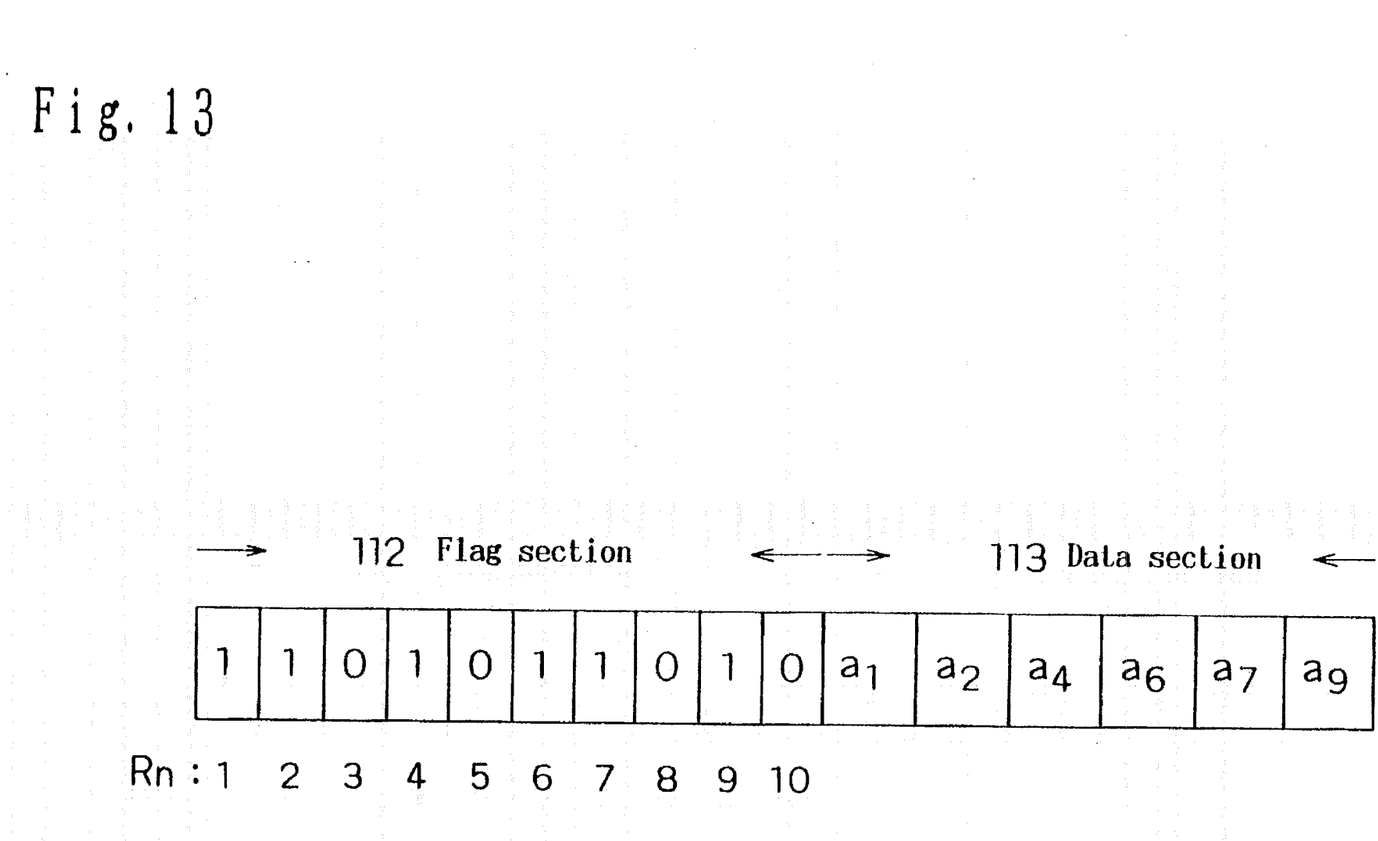
FIG. 13 is a diagram showing an example of the flag section and the data section set by the base station H in the second embodiment.

In FIG. 13, the flag section 112 has the bit corresponding to $R_n$ which the base station H received $t_{max}$ time after broadcasting the start of communication, only designated to 1 and other bits to 0. In FIG. 13, the base station receives replies from the secondary stations whose $R_n$ is 1, 2, 4, 6, 7, and 9. Then, the data section 113 establishes $a_n$ received together with $R_n$ in order of $R_n$ corresponding to the flag section 112. For the secondary sections which did not return $R_n$, needless to say, $a_n$ is not established because $a_n$ is not returned. In other words, FIG. 13 shows the transmission data from the base station H to the secondary station and specifies the secondary station as the communication counterpart or the party to which the data is transmitted, whose flag section 112 corresponds to $R_n$ of 1.

Figure 14:
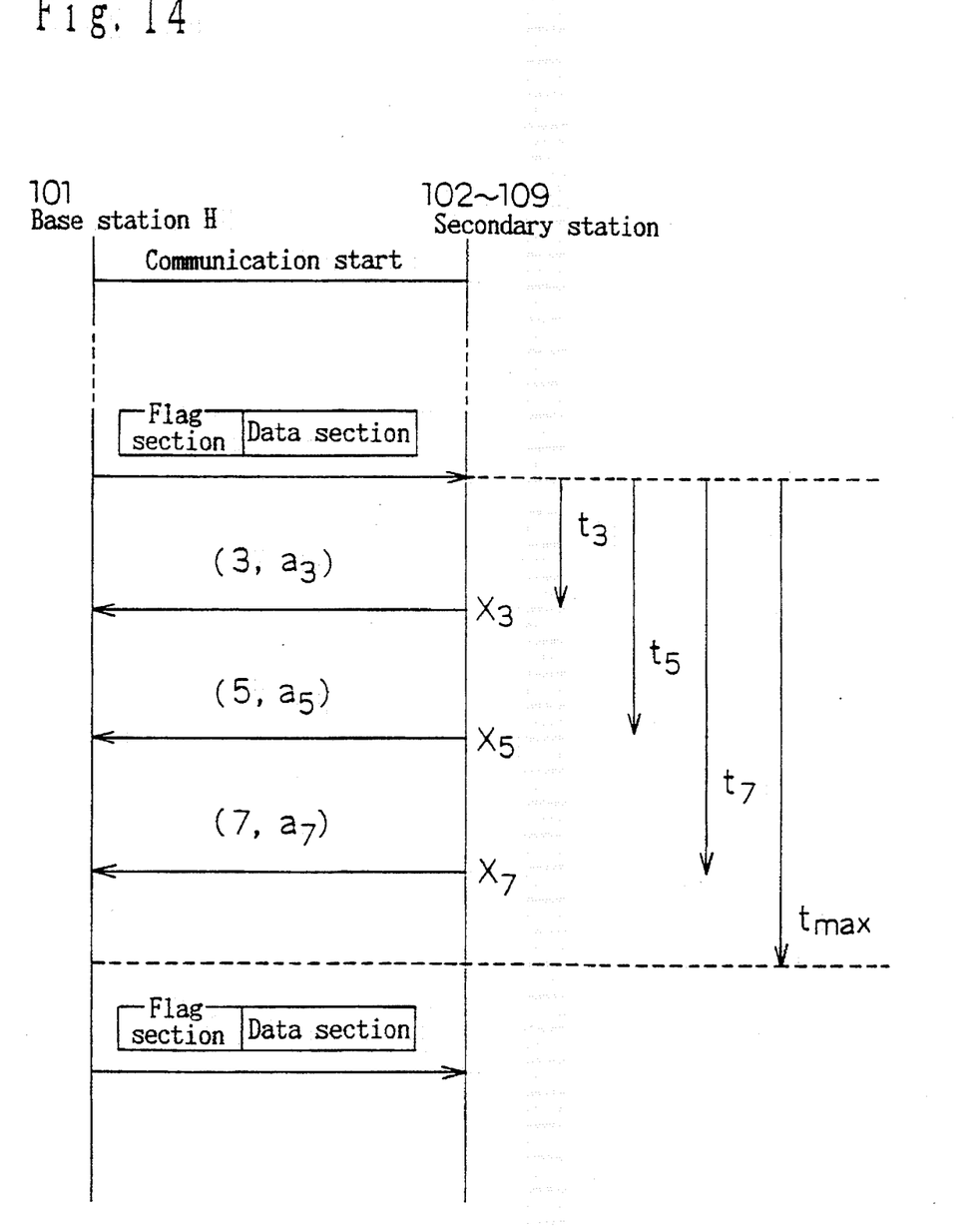
FIG. 14 is a diagram showing an example of the communication procedure between the base station H and each one of the secondary stations $X_1$-$X_n$ from broadcasting the initial flag section and data section to the next broadcasting in the second embodiment.

FIG. 14 is a diagram showing the transaction between the base station H and the secondary section of FIG. 12 from the first broadcasting of the flag section and the data section to the second broadcasting of the flag section and the data section. The secondary station generates ($R_n$, $a_n$) again and transmits to the base station H when the flag section and the data section received fit to any of the cases later discussed.

One case is when the bit of the flag section corresponding to $R_n$ generated by itself and transmitted by any reason such as communication trouble is 0, and the other case is when the corresponding $a_n$ differs from the $a_n$ generated by itself and transmitted due to collision of secondary stations even if the bit of the flag section is 1. In this case, the random number $R_n$ which the applicable secondary station generates newly is generated from the values corresponding to the bit 0 of the flag section and the values which the secondary station itself generated previously.

For example, in FIG. 13, assume that communication collision occurred because a secondary station which transmitted $R_n$ =3 existed and two secondary stations which transmitted $R_n$ =7 existed, and the $a_7$ value differed the $a_7$ which either of the secondary stations differed. In this event, the secondary station which transmitted $R_n$=3 generates a new $R_n$ from (3, 5, 8, 10) and the secondary station which transmitted $R_n$=7 generates a new $R_n$ from (3, 5, 7, 8, 10). The example of FIG. 14 indicates that the aforementioned three secondary stations generated and transmitted $R_n$ of 3, 5, 7, respectively. Repeating the above procedures, $R_n$ which is not duplicated is established in all the secondary stations and this $R_n$ becomes the address of the secondary station in the transmission thereafter.

As described above, in the 1:N communication system connected by radio or bus, replying using the time value by the random number, collision of communication from the secondary station is prevented, and further establishing the address of each secondary station by communication processing after the start of communication, communication is enabled without fixing the system configuration and the number of secondary stations. This enables broadcasting in which the counterpart from the base station to the secondary station is specified, detection of communication results, and retransmission at the time of trouble as well as detection of trouble such as collision during transmission, thereby achieving 1:N communication with good communication efficiency. When any trouble occurs between the base station and the secondary station with respect to communication, the secondary station which generated trouble is identified, enabling both base and secondary stations to process for retransmission.

In the second embodiment discussed above, the number of the secondary stations was specified to be 8 but needless to say, the number of the secondary stations shall not be limited to this.

In the second embodiment discussed above, the type of random number generated was specified as the total number of secondary stations plus 2, that is, a is 2, but this is to prevent duplication of the random number to be generated and shall not be limited to this, and it may be 0 or over.

In the second embodiment discussed above, the data section broadcasted from the base station was designed to establish the data only (random number $a_n$) in which the bit of the flag section corresponds to 1, but this is not restrictive but a specified data which can be distinguished from the random number $a_n$ can be established even for the case when the bit of the flag section is 0.

As clear from what has been described, this invention has advantages in that it can flexibly accommodate changes in communication system configuration and can improve the communication efficiency.

What is claimed is:

1. A communication method in which 1:N communication is carried out between a base station H and a total of N secondary stations X, wherein the total number N of the secondary stations is inputted to said base station H in advance, said secondary stations being communication counterparts to the base station H, when broadcasting of communication start is carried out from said base station H, the base station H broadcasts the total number N, the secondary stations X that received the notice of the total number N generate random numbers $R_n$, each of the random numbers $R_n$ is a number from 1 to N+$\alpha$, wherein $\alpha$ is an integer equal to or greater than 0, and based on the random numbers $R_n$, the secondary stations X calculate a time value $t_n$ and transmit data to the base station H at said $t_n$ time after the broadcasting was received from the base station H to furnish a response to the broadcasting from the base station H.

2. A communication method in which 1:N communication is carried out between a base station H and a total of N secondary stations X, wherein the total number N of the secondary stations is inputted to said base station H in advance, said secondary stations being communication counterparts to the base station H, when broadcasting of communication start is carried out from said base station H, the base station H broadcasts the total number N, the secondary stations X that received the notice of the total number N generate random numbers $R_n$, each of the random numbers $R_n$ is a number from 1 to N+$\alpha$, wherein $\alpha$ is an integer equal to or greater than 0, and another optional random number $a_n$, based on the random number $R_n$, a time value $t_n$ is calculated, at $t_n$ time after the broadcasting was received by the secondary stations X from the base station H, the random number $R_n$ and the random number $a_n$ are transmitted by said secondary stations X, and the base station H which received the random numbers broadcasts after a specified time to the secondary stations X the random number $R_n$ and either the random number $a_n$ or information obtained based on a predetermined rule, and the secondary stations X which received the broadcasted contents (1) establish when the random number $R_n$ and the random number $a_n$, which the secondary stations X generated, are present in the received broadcasted contents, the $R_n$ becoming an address of the secondary station X, and (2) generate again a random number $a_n$ and a random number $R_n$ which is not established as an address and send said random number $a_n$ and said random number $R_n$ to the base station H, when at least either one of the random number $R_n$ and the random number $a_n$, which the secondary stations X generated, is not present in the received broadcasted contents from the base station H, and the above operations are repeated between the base station H and the secondary stations X until addresses are established for all of the secondary stations X.

3. A communication method according to claim 2, wherein the information obtained based on the predetermined rule is one in which for a flag section comprising N+$\alpha$ bits, a bit corresponding to the random number $R_n$ which the base station H received is truly established, and a bit corresponding to the random number $R_n$ which is not received is falsely established, a data section is added to the flag section, and for the data section, a random number $a_n$ is established for the true bit of the flag section and a specified data other than $a_n$ is established for the false bit of the flag section, and the secondary station X which received the information generates and returns random number $R_n$ and random number $a_n$ again to the base station H when the information of the flag section corresponding to the random number $R_n$ which the station itself generated indicates falsity or when the value of random number $a_n$ of the data section corresponding to the random number $R_n$ differs from the value of random number $a_n$ which the station itself generated and replied to the base station H even if the information indicates true.

4. A communication method according to claim 3, wherein random number $R_n$ to be regenerated shall be selected from the random numbers $R_n$ when all the random numbers $R_n$ of the flag sections which indicate falsity and the value $a_n$ of the data section corresponding to random number $R_n$ differ from the value $a_n$ generated by itself and returned to the base station H.

5. A communication method according to claim 4, wherein the base station H does not establish the specified data for the bit of the false information of the flag section with respect to the data section and establishes the random number $a_n$ only for the bit of the true information of the flag section.

6. A communication method according to claim 3, wherein the base station H does not establish the specified data for the bit of the false information of the flag section with respect to the data section and establishes the random number $a_n$ only for the bit of the true information of the flag section.

* * * * *